(12) United States Patent
Goldberg

(10) Patent No.: US 9,457,249 B2
(45) Date of Patent: Oct. 4, 2016

(54) SPORTS TRAINING DEVICE AND IMPLEMENTATION THEREOF

(71) Applicant: Robert Marc Goldberg, Fayetteville, NY (US)

(72) Inventor: Robert Marc Goldberg, Fayetteville, NY (US)

( * ) Notice: Subject to any disclaimer, the term of this patent is extended or adjusted under 35 U.S.C. 154(b) by 43 days.

(21) Appl. No.: 14/193,919

(22) Filed: Feb. 28, 2014

(65) Prior Publication Data

US 2015/0246275 A1  Sep. 3, 2015

(51) Int. Cl.
| | |
|---|---|
| A63B 69/00 | (2006.01) |
| A63B 63/00 | (2006.01) |
| A63B 71/06 | (2006.01) |
| H04M 1/725 | (2006.01) |
| A63B 63/06 | (2006.01) |

(52) U.S. Cl.
CPC ............. *A63B 63/004* (2013.01); *A63B 69/00* (2013.01); *A63B 71/06* (2013.01); *H04M 1/725* (2013.01); *A63B 63/00* (2013.01); *A63B 63/06* (2013.01); *A63B 69/0002* (2013.01); *A63B 69/002* (2013.01); *A63B 69/0026* (2013.01); *A63B 2071/0694* (2013.01); *A63B 2102/14* (2015.10); *A63B 2102/22* (2015.10); *A63B 2209/08* (2013.01); *A63B 2220/801* (2013.01); *A63B 2220/805* (2013.01); *A63B 2220/833* (2013.01); *A63B 2225/20* (2013.01); *A63B 2225/50* (2013.01); *A63B 2243/0025* (2013.01); *A63B 2243/0045* (2013.01)

(58) Field of Classification Search
CPC .. A63B 61/00; A63B 63/004; A63B 63/083; A63B 24/0021; A63B 63/00; A63B 6/06; A63B 69/0002; A63B 71/022; A63B 63/06

USPC ............... 473/422, 446, 478, 454–456, 477; 273/400
See application file for complete search history.

(56) References Cited

U.S. PATENT DOCUMENTS

| | | | | |
|---|---|---|---|---|
| 2,372,111 | A | | 3/1945 | Norberg |
| 3,328,033 | A | * | 6/1967 | Hendry .................. A63B 63/00 473/184 |
| 3,583,703 | A | * | 6/1971 | Brown et al. .................. 473/456 |
| 3,820,787 | A | * | 6/1974 | Heinbigner .................... 473/439 |
| 4,072,295 | A | * | 2/1978 | Roberts ............. A63B 69/0002 473/421 |
| 4,245,843 | A | * | 1/1981 | Griggs ................... A63B 63/00 473/446 |
| 4,842,283 | A | * | 6/1989 | LeBel .................... A63B 63/06 473/478 |
| 4,927,145 | A | * | 5/1990 | Davis .................... A63F 7/0668 273/371 |
| 4,932,657 | A | * | 6/1990 | Hailer et al. .................. 473/446 |
| 5,054,791 | A | * | 10/1991 | Ball .................. A63B 69/0097 473/478 |
| 5,280,919 | A | | 1/1994 | Graham |
| 5,342,062 | A | | 8/1994 | Lance |
| 5,511,775 | A | * | 4/1996 | Parks ........................... 473/454 |
| 5,829,753 | A | | 11/1998 | Wiser |
| 5,857,928 | A | * | 1/1999 | Stewart ........................ 473/446 |

(Continued)

FOREIGN PATENT DOCUMENTS

DE          3344955 A1 *  6/1985  ............. A63B 63/00

*Primary Examiner* — Mitra Aryanpour
(74) *Attorney, Agent, or Firm* — Paul Frank + Collins P.C.

(57) ABSTRACT

Embodiments of a sports training device that incorporates structure to facilitate installation and transport. These embodiments include a frame with one or more articulating sections that can change the configuration of the frame. The different configurations can change the dimensions of the sports training device, e.g., reducing the dimensions for transport and increasing the dimensions to match the opening of a goal.

16 Claims, 11 Drawing Sheets

(56) References Cited

U.S. PATENT DOCUMENTS

| | | | |
|---|---|---|---|
| 5,888,153 A * | 3/1999 | Masin | A63B 63/00 473/446 |
| 6,398,215 B1 | 6/2002 | Carroll | |
| 6,575,851 B1 * | 6/2003 | Lamberti | A63B 69/0097 473/435 |
| 6,620,065 B2 * | 9/2003 | Clabough | A63B 63/00 473/454 |
| 6,926,624 B1 * | 8/2005 | Witzke | A63B 69/0026 473/446 |
| 6,975,859 B1 | 12/2005 | Lambert et al. | |
| 6,994,349 B2 | 2/2006 | Lambert et al. | |
| 7,134,976 B1 | 11/2006 | Smith | |
| 7,252,604 B2 * | 8/2007 | Birss | A63B 63/003 473/446 |
| 7,270,608 B2 * | 9/2007 | Cho | 473/197 |
| 7,661,679 B2 * | 2/2010 | Mah | A63B 69/0026 473/446 |
| 7,690,656 B2 | 4/2010 | Saunders | |
| 7,731,610 B2 * | 6/2010 | Im | 473/476 |
| 8,109,845 B2 * | 2/2012 | Duty | 473/446 |
| 8,172,231 B2 | 5/2012 | Massier | |
| 2003/0153412 A1 * | 8/2003 | Duba | A63B 63/004 473/478 |
| 2003/0228943 A1 * | 12/2003 | Powell | 473/454 |
| 2006/0284035 A1 | 12/2006 | Crosby | |
| 2008/0111312 A1 * | 5/2008 | Longo et al. | 273/402 |
| 2008/0248901 A1 | 10/2008 | Mosier et al. | |
| 2009/0176603 A1 * | 7/2009 | Prince | 473/446 |
| 2012/0052989 A1 * | 3/2012 | Bishop | 473/456 |
| 2015/0246275 A1 * | 9/2015 | Goldberg | A63B 63/004 473/446 |

* cited by examiner

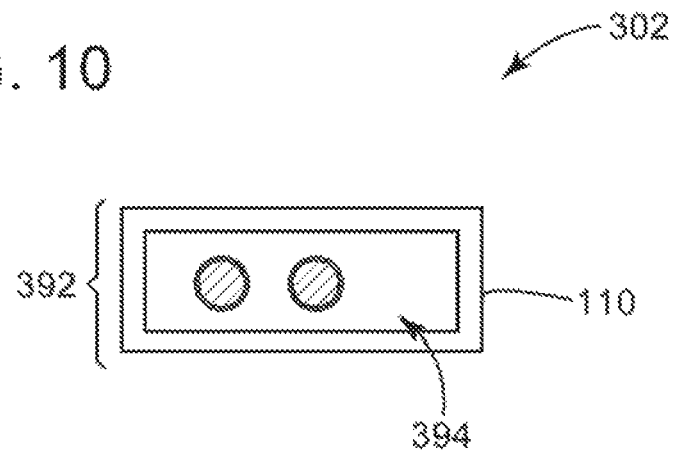
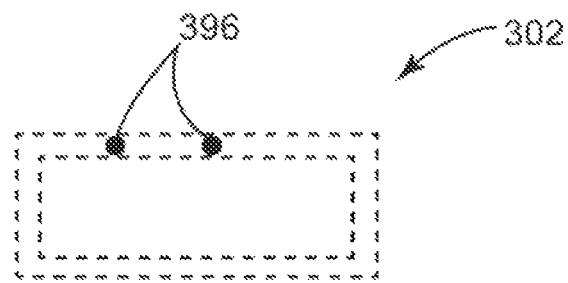

SPORTS TRAINING DEVICE AND IMPLEMENTATION THEREOF

BACKGROUND

The subject matter disclosed herein relates to athletics and sports technology with particular discussion about training devices that position targets proximate a goal.

Many sports utilize a projectile that participants try to deliver into a goal. In soccer, participants use the foot (or feet) to strike a ball. In other sports like hockey, lacrosse, and field hockey, participants use a stick to carry, strike, and/or launch the projectile.

Athletes that are successful typically train for many hours to develop skills particular to their respective endeavors. This training can take many forms. For example, athletes may participate in drills and exercises that focus on certain facets of a sport. Some drills may incorporate equipment of particular design that serves to further the development of the skills. This equipment may include one or more targets, which athletes attempt to hit with the projectile. Training with these targets can help improve the accuracy with which athletes can deliver the ball or projectile.

In many respects, training with targets and related devices emphasizes repetition of an act or acts to enhance muscle memory and coordination. While desirable for purposes of improving skills, use of these devices can become monotonous, thereby causing athletes to lose interest in training. Insufficient interest can, in turn, reduce the effectiveness of both the training device and the drill that the athlete is to engage in during the training exercise.

Conventional devices are known to deploy targets for accuracy training. Many of these devices are designed for use with firearms and/or archery equipment, providing a centralized frame structure that displays the target. This configuration positions the targets in a way that the end user can safely fire projectiles to attempt to hit the targets. For sports training, some of the available devices utilize individual target members that secure to locations on the goal. On the other hand, those devices that include a centralized frame structure often fail to account for installation, removal, and transport of the structure in the design.

BRIEF SUMMARY OF THE INVENTION

This disclosure describes embodiments of a sports training device with structure that facilitates installation and transport. These embodiments find use as part of a training system with interactive features that can retain the interest of an end user. As discussed more below, these embodiments include a frame with one or more articulating sections that can change the configuration of the frame. The different configurations can change the dimensions of the sports training device, e.g., reducing the dimensions for transport and increasing the dimensions to match the opening of a goal.

BRIEF DESCRIPTION OF THE DRAWINGS

Reference is now made briefly to the accompanying figures, in which:

FIG. 10 depicts a cross-section view of the frame of the device of FIGS. 6 and 7 with one configuration of a wiring harness disposed therein;

FIG. 11 depicts a cross-section view of the frame device of FIGS. 6 and 7 with one configuration of a conductor integrated with the frame.

Where applicable like reference characters designate identical or corresponding components and units throughout the several views, which are not to scale unless otherwise indicated.

DETAILED DISCUSSION

Figure 1:
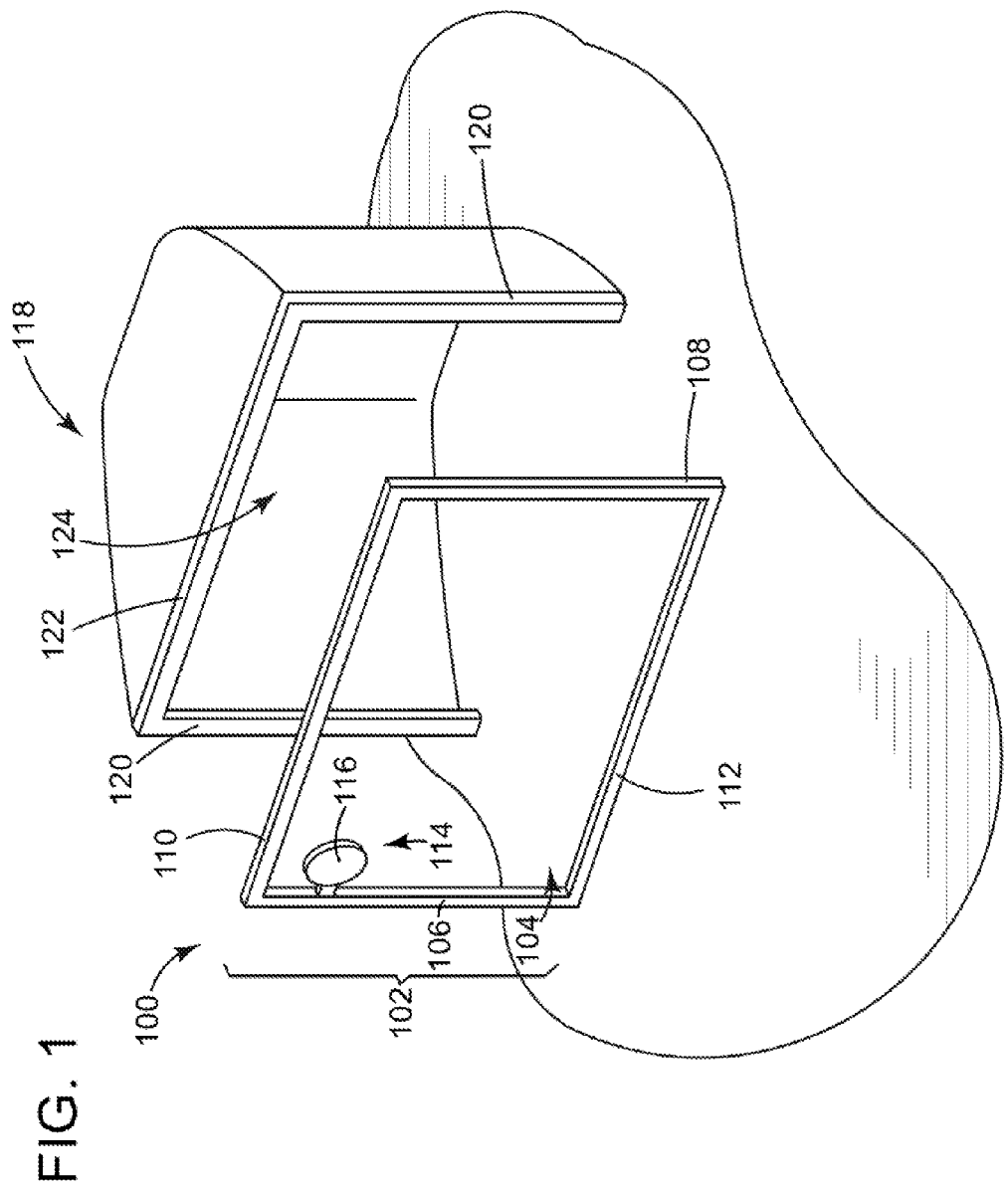
FIG. 1 depicts a perspective view of an exemplary embodiment of a sports training device in position proximate a goal.

FIG. 1 illustrates a diagram of an exemplary embodiment of a sports training device 100 (also "device 100") that is useful for athletic training. The embodiment includes a frame assembly with a frame 102 that at least partially circumscribes a frame opening 104. The frame 102 has one or more frame members (e.g., a first frame member 106, a second frame member 108, a third frame member 110, and a fourth frame member 112). The device 100 also includes a target assembly with a target member 114 that is configured to couple with the frame 102 on, for example, one of the frame members 106, 108, 110, 112. The target member 114 includes a target 116 that extends into the frame opening 104. The device 100 is shown in FIG. 1 proximate, but spaced apart from, a goal 118. Examples of the goal 118 have a goal frame with a pair of upright posts 120 and a crossbeam 122. Although the dimensions of the goal opening 124 may change, this construction of the goal 118 is typical of most structures for use in soccer, lacrosse, hockey, field hockey, etc. At the front, or "goal face," the goal frame defines a goal opening 124 through which athletes attempt to deliver the projectile to score a "goal."

Broadly, the device 100 can assume various configurations that make the device easy to install, remove, and transport. These configurations include, for example, a first configuration that readies the device 100 to install on the goal 118 at the goal face. In the first configuration, the device 100 can couple with the goal frame, e.g., by securing one or more of the frame members 106, 108, 110, 112 to the upright posts 120 and the crossbeam 122. The configurations can also include a second configuration in which the device 100 is sized and configured in a way that is different from the first configuration. The second configuration makes the device 100 more readily portable, e.g., to transport to and from a location remote from the goal 118. In one example, the size of the device 100 in the second configuration is smaller than the size of the device 100 in the first configuration.

The device 100 can also be configured to receive and/or exchange outputs from a common connection. Examples of this common connection may include a device with one or more connectors that offer an interface for one or more peripheral devices (e.g., a monitor, a digital readout, etc.) In some implementations, the target members may couple together to form an integrated array that can receive inputs/outputs from the common connection. The integrated array may utilize a wiring harness, which winds through one or more of the frame members 106, 108, 110, 112 of the frame assembly. In lieu of the wiring harness, examples of the frame assembly may include elements (e.g., the frame members 106, 108, 110, 112) that integrate conductive material that can conduct signals (e.g., electrical signals) between the common connection and the target members of the integrated array. This configuration with the conductive "traces" can further simplify the design of the device 100 to alleviate issues with wire fatigue and/or failure. In some aspects, construction might require the use of various connectors that couple one or more of the conductive "traces" together to complete an electrical circuit.

In one implementation, the device 100 mounts onto the goal 118 in position for athletes to direct the projectile towards the goal 118 and hit the target member 114. This feature imparts rigidity to the device 100, thus allowing the frame assembly to retain the necessary degrees of freedom and/or "flexibility" to achieve the different configurations contemplated herein. The device 100 may also include a fastening assembly to secure the device 100 to the goal 118. The fastening assembly may include one or more fastening devices that engage the members of the frame 102 and the members of the goal frame. These fastening devices may include fasteners (e.g., nuts, bolts, screws) alone and/or in combination with one or more components (e.g., brackets, straps, etc.). The fastening devices can securely connect the device 100 to the goal 118 to effectively align the frame opening 104 with the goal opening 124. As shown in FIG. 1, alignment between the openings 104, 124 can locate the target member 114 at the periphery of the goal face with the target 116 extending into the goal opening 124.

Examples of the target member 114 can operate in response to contact by the projectile. This response may, for example, activate an audible alert, a visual alert, and/or other response that could indicate contact. As explained further below, other response may cause operation of a monitor and/or display that is configured to provide some identifier (e.g., a score or tally) of contact of the projectile with the target.

While various constructions are contemplated, the target member 114 may be configured to change orientation in response to contact from the projectile. The different orientations are useful to register contact to provide, in one implementation, a scoring mechanism that tallies and/or rates the ability of the athlete to hit the target member 114. As noted more below, the target assembly can include a plurality of target members (e.g., target member 114) in an arrangement about the frame 102. The arrangement can locate target member at positions on the frame 102 that correspond to various areas of the goal opening 124. These positions may be found at the periphery of the goal opening 124, which helps the athlete develop skills to accurately deliver the projectile to certain areas of the goal opening 124 that will likely result in success.

Figure 2:
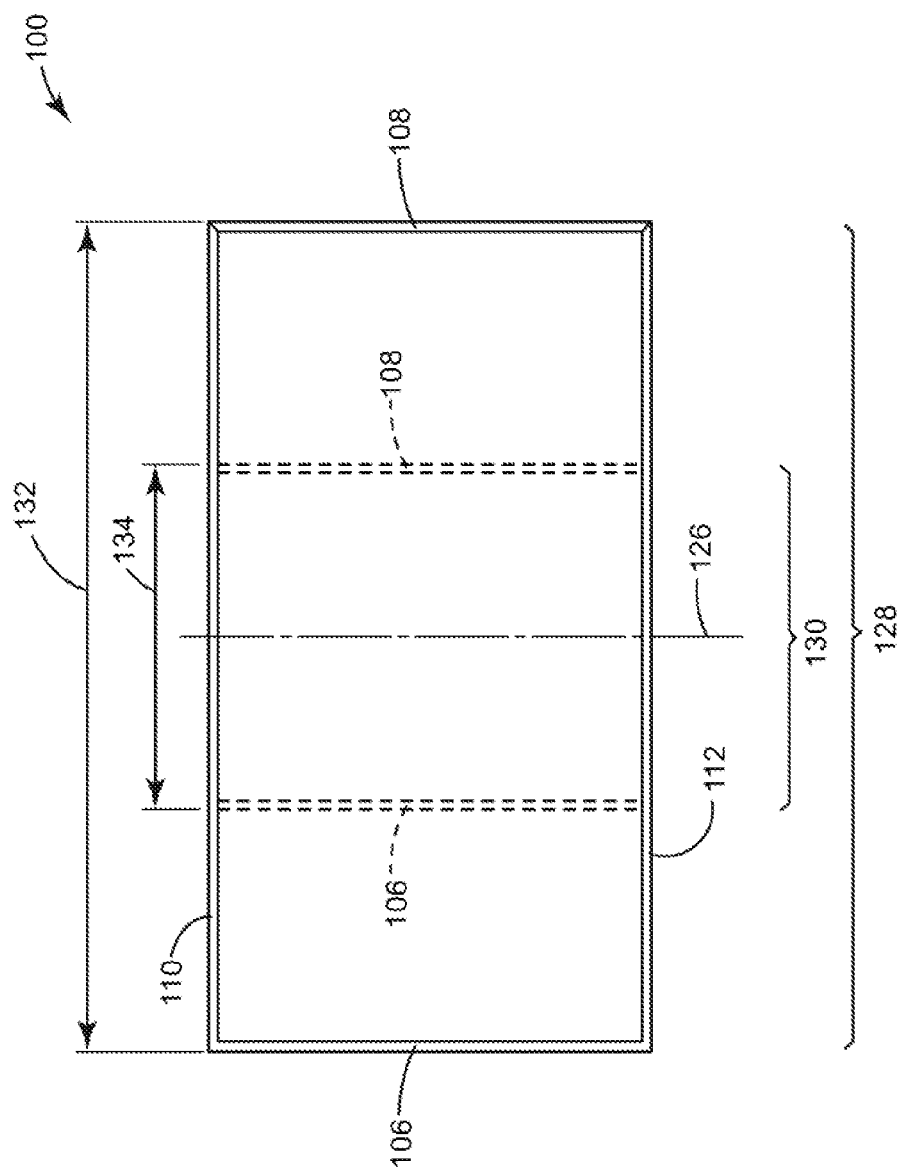
FIG. 2 depicts a front, elevation view of the sports training device of FIG. 1 to illustrate a first set of configurations for the frame of the device.
Figure 3:
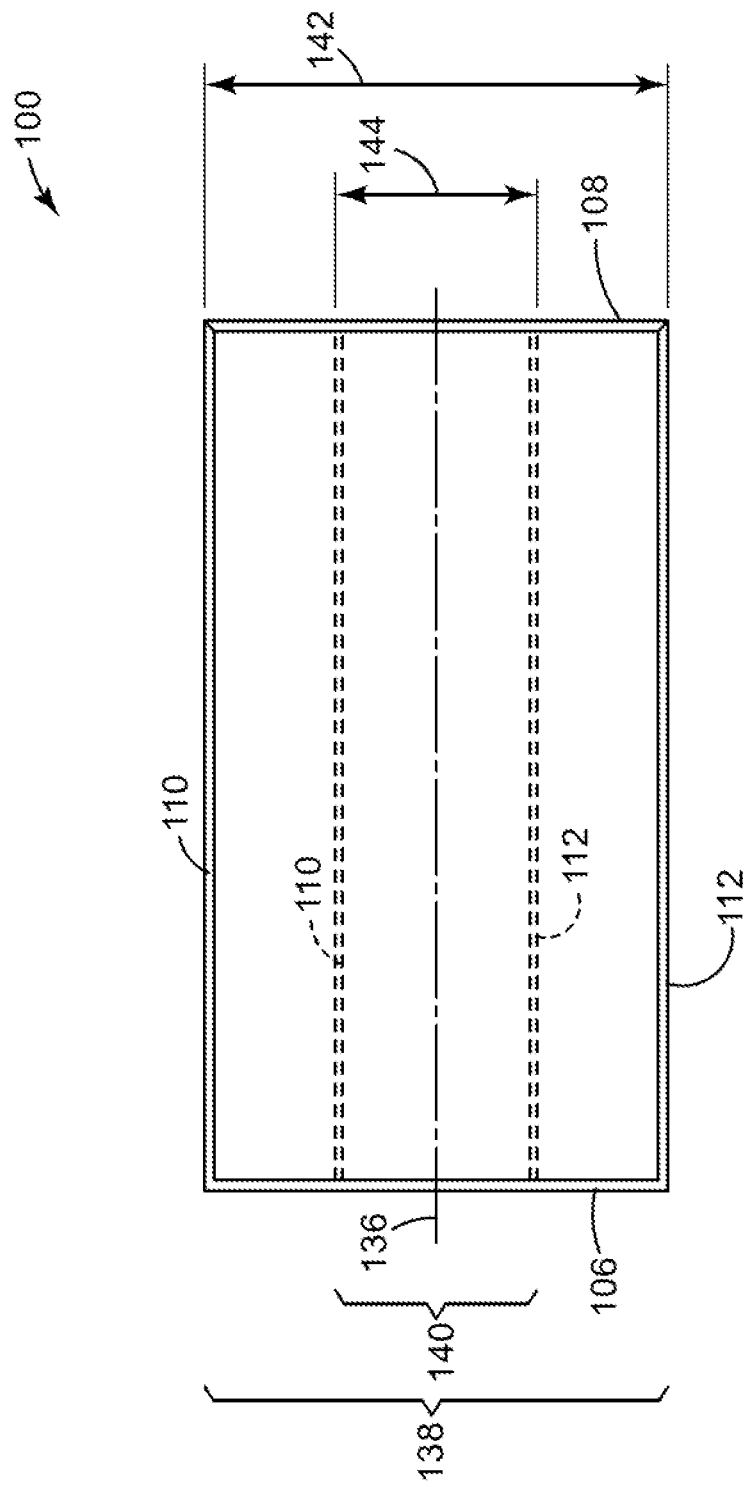
FIG. 3 depicts a front, elevation view of the sports training device of FIG. 1 to illustrate a second set of configurations for the frame of the device.

FIGS. 2 and 3 offer a front, elevation view of the device 100 to illustrate several configurations that are amenable to use with a goal. Several components have been removed from the drawings both for clarity and to focus the discussion on certain features of the embodiment presented therein. In FIG. 2, the device 100 has a first center plane 126 that bisects the frame 102 between the first frame member 106 and the second frame member 108. The frame 102 has a first configuration 128 and a second configuration, shown generally in phantom lines and denoted by the numeral 130. The configurations 128, 130 define a frame member distance; for example, one or more outer dimensions that establish the outer boundaries of the device 100. In one example, these outer dimensions are measured between the first frame member 106 and the second frame member 108. The frame member distance includes a first frame member distance 132 and a second frame member distance 134, which correspond to, respectively, the first configuration 128 and the second configuration 130 for the frame 102. In the example of FIG. 3, the device 100 has a second center plane 136, which bisects the frame 102 between the third frame member 110 and the fourth frame member 112. The frame 102 in this example also can assume a third configuration 138 and a fourth configuration, also shown generally in phantom lines and denoted by the numeral 140, each of which correspond to a third frame member distance 142 and a fourth frame member distance 144, respectively.

The device 100 can change in size and/or shape for an end user to deploy and re-deploy, as desired. The first and third configurations 128, 138, for example, arrange the device 100 to install onto the front of a goal (e.g., goal 118 of FIG. 1) to position the targets about the periphery of the goal face. On the other hand, the second and fourth configurations 136, 140 can reduce the size of the device 100 for easy stowage and transport. These configurations reduce at least one of the frame dimensions (e.g., the second and fourth frame dimensions 134, 144 are smaller than the first and third dimensions 132, 142). This feature makes the device 100 favorable as part of daily training and practice regimen, wherein embodiments of the device 100 can be readily fit onto the goal for practice and removed after athletes complete the training segment that involves the device 100. Likewise, the various configurations allow the device 100 to be packed and set-up for use in various recreational settings (e.g., home, parks, etc.).

Construction of the frame 102 can allow the device 100 to achieve the various configurations. The frame 102 may include one or more articulating joints to allow parts of the frame 102 to move relative to one another. In one example, the articulating joints may facilitate rotation of parts of the frame. Other examples can include telescoping features, e.g., wherein the frame members include a plurality of pieces that interleave with one another to allow lateral movement of the pieces relative to one another.

Figure 4:
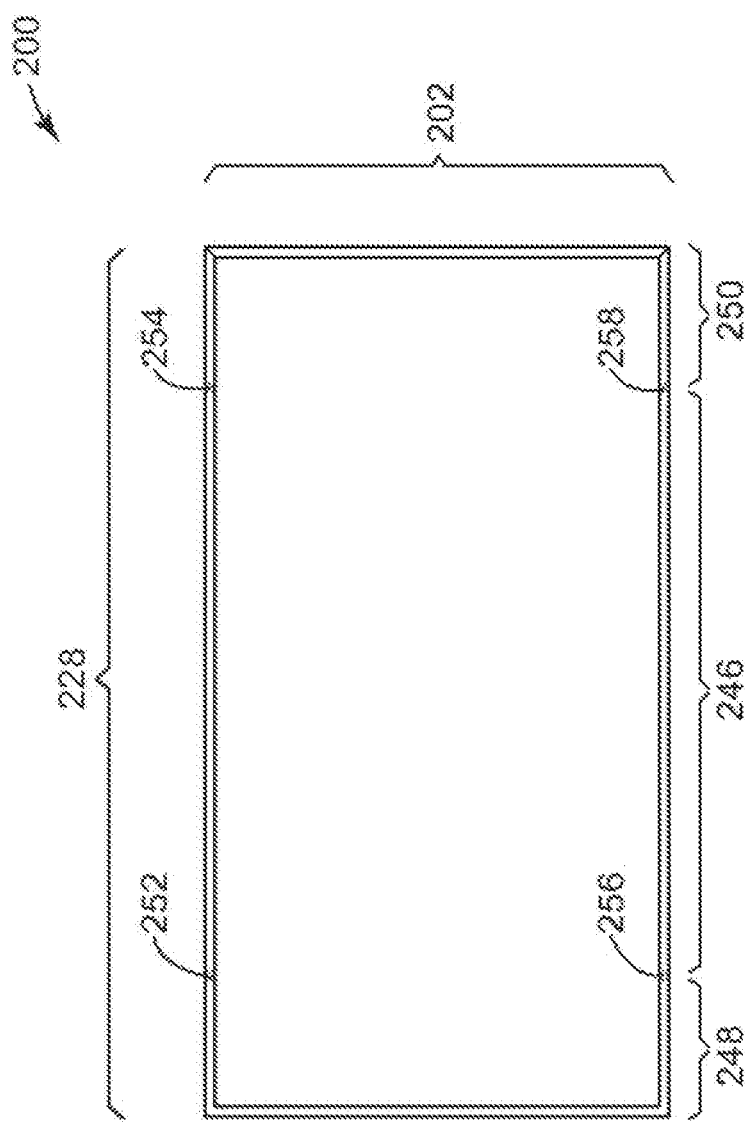
FIG. 4 depicts a front, elevation view of an exemplary embodiment of a sports training device to show one construction of the device that can change the configurations of the frame.
Figure 5:
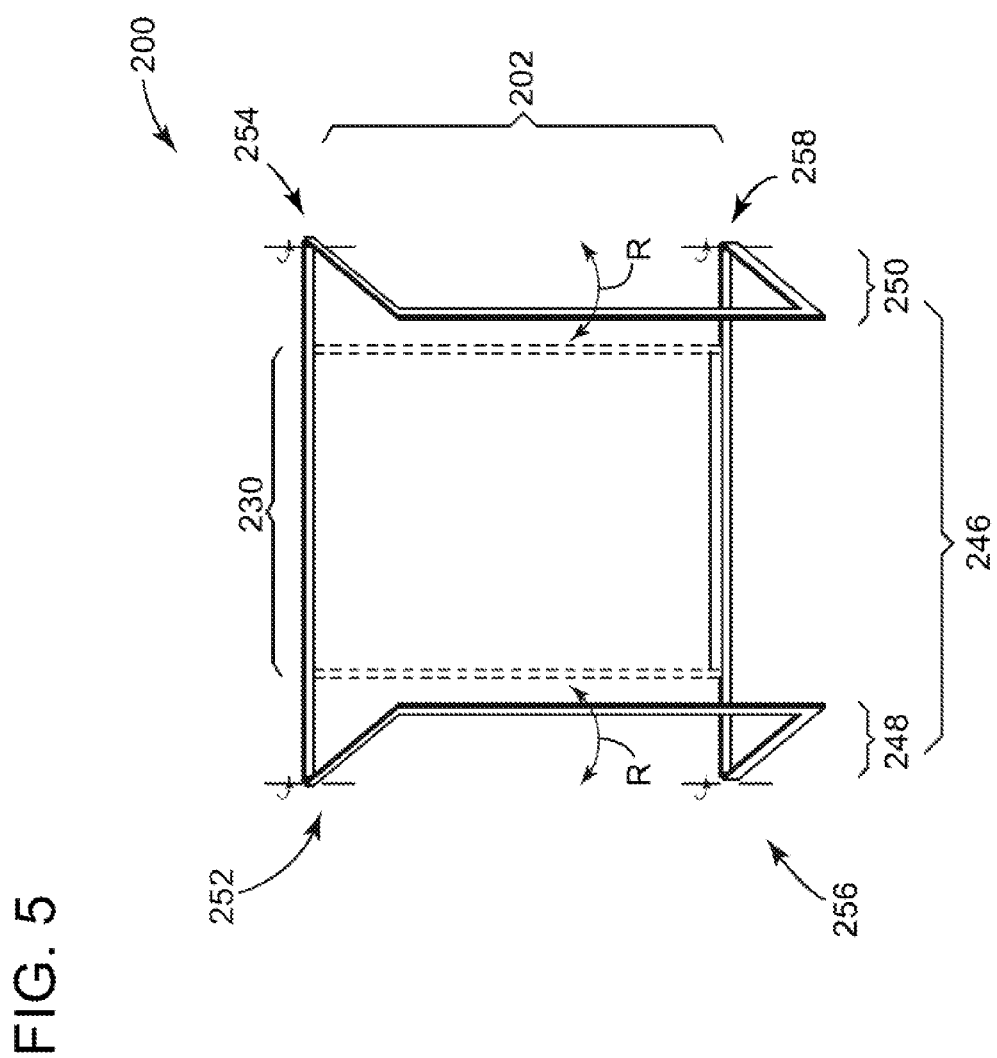
FIG. 5 depicts a top, perspective view of the sports training device of FIG. 4.

FIGS. 4 and 5 depict a front view (FIG. 4) and a perspective view (FIG. 5) of an exemplary embodiment of a sports training device 200 with one construction of articulating joints that is useful for the device 100 to change between configurations discussed herein. In FIG. 4, the frame 202 includes several sections (e.g., a central section 246, a first peripheral section 248, and a second peripheral section 250). The frame 202 also has one or more articulating joints (e.g., a first joint 252, a second joint 254, a third joint 256, and a fourth joint 258) that, in the present example, couple the central section 246 with the peripheral sections 248, 250. Examples of the joints 252, 254, 256, 258 can include hinges, rotatable couplings, and like elements that have at least one at least one degree of freedom. As best shown in FIG. 5, the joints 252, 254, 256, 258 can allow the peripheral sections 248, 250 to move (e.g., rotation R) relative to the central section 246. In this way, the frame 202 can change configurations from, for example, the first configuration 228 (FIG. 4) to the second configuration 230 (FIG. 5).

Figure 6:
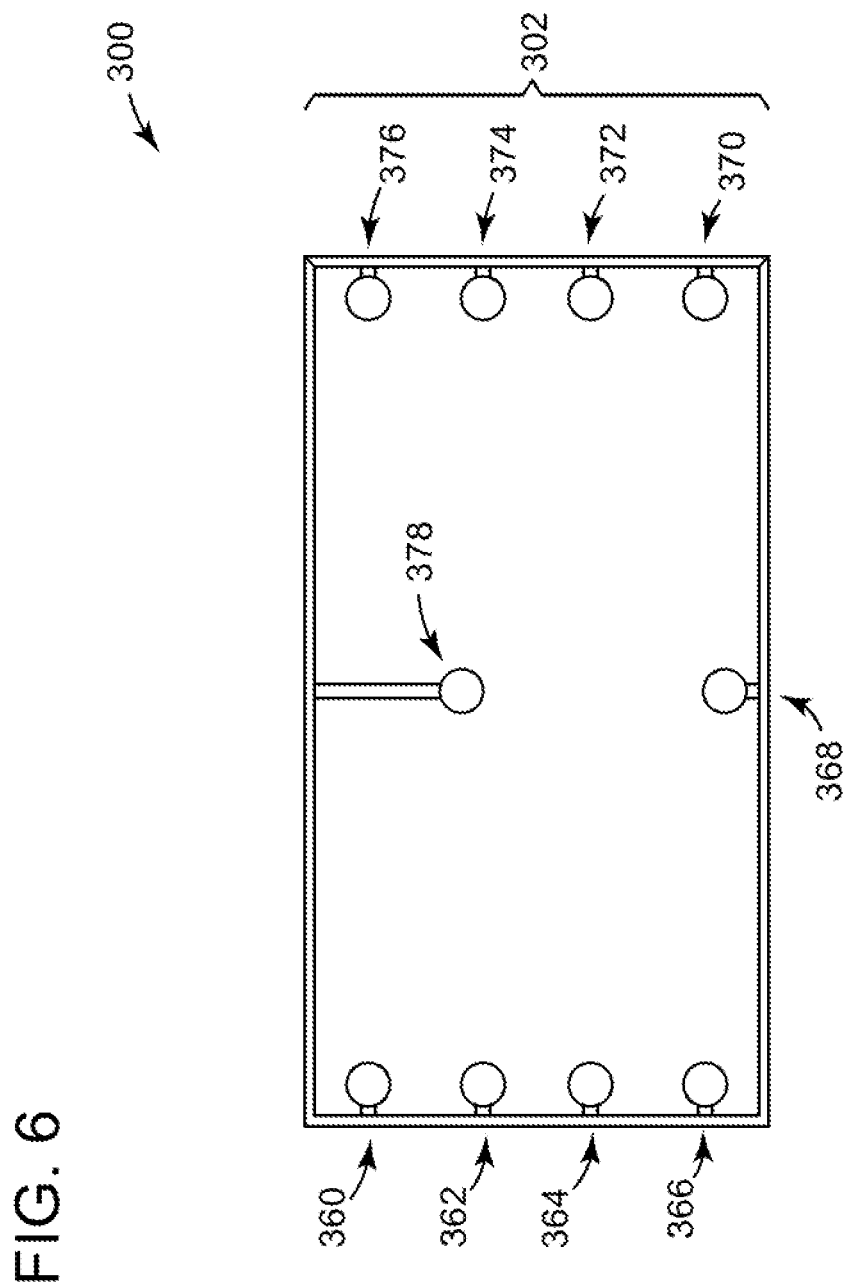
FIG. 6 depicts a front, elevation view of an exemplary embodiment of a sports training device that illustrates one arrangement for target members on the device.
Figure 7:
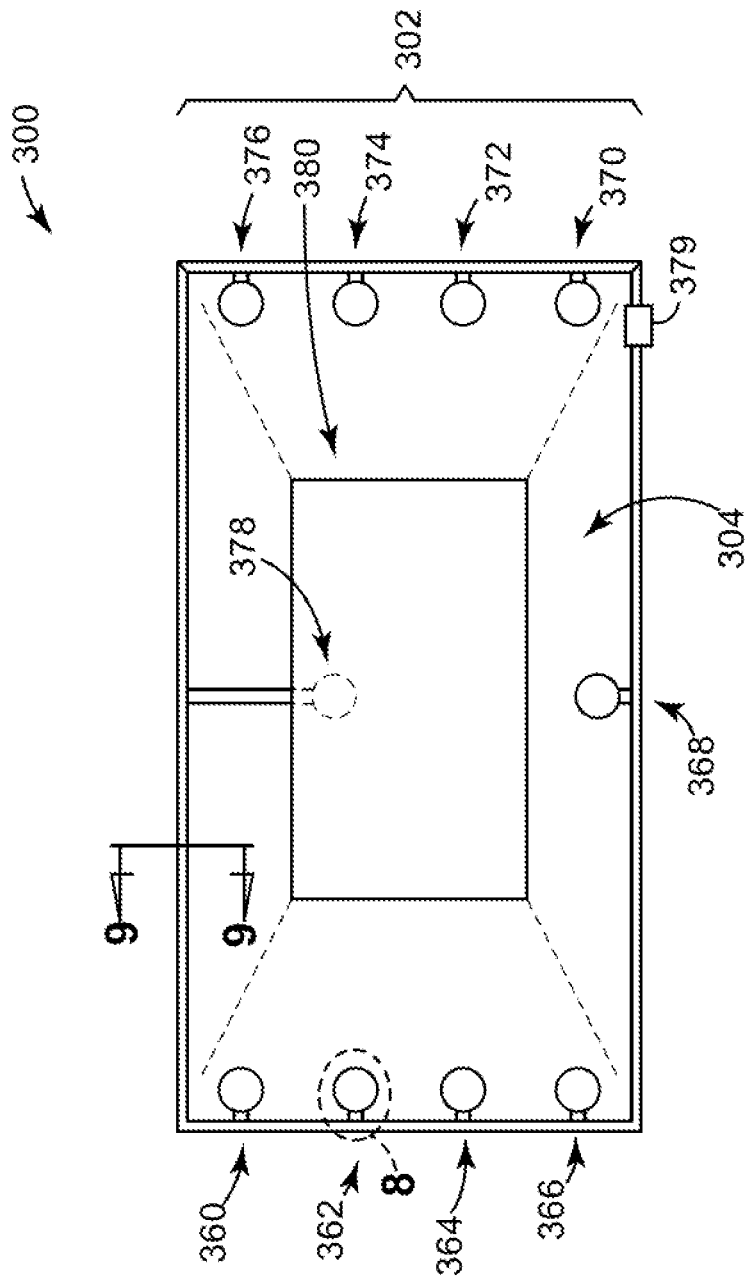
FIG. 7 depicts the sports training device of FIG. 6 in an exemplary configuration with a central panel member to simulate an obstruction.

FIGS. 6 and 7 illustrate a front, elevation view of an exemplary embodiment of a sports training device 300 to discuss further aspects of the proposed designs. In FIG. 6, the target assembly includes a plurality of target members (e.g., target member 114 of FIG. 1) arranged about the frame 302 and denoted generally with the numerals 360, 362, 364, 366, 368, 370, 372, 374, 376, 378. FIG. 7 shows a configuration for the embodiment that also includes a device input panel 379 and a central panel member 380 that covers at least part of the frame opening 304. Examples of the central panel member 380 can comprise a panel of material (e.g., plastic, fabric, etc.) that couples with the frame 302 to position the panel in the frame opening 304. As noted above, the target assembly can arrange the target members to correspond with areas of the goal opening (e.g., goal opening 124 of FIG. 1). The arrangement in FIGS. 6 and 7, for example, positions the target members about the periphery of the goal opening to allow the athlete to develop skills that accurately place the projectile in these areas. The target member 378 and the central panel member 380 can provide an obstacle to entry of the projectile into the goal, thus simulating a player (also a "goalie" or "goalkeeper") that is present in the goal face.

Embodiments of the device 300 may also include a transport assembly to facilitate transport of the device 300. The transport assembly may include operative elements (e.g., casters, wheels, etc.) that secure to the frame assembly, for example, to one or more of the frame members. The transport assembly may further include a handle or like implement. In one implementation, the end user can grasp the handle to move the device 300 (in the folded configuration), leveraging the motive feature (e.g., rolling, sliding, etc.) of the operative elements in lieu of picking the device 300 off of the ground to transport to another location.

Figure 8:
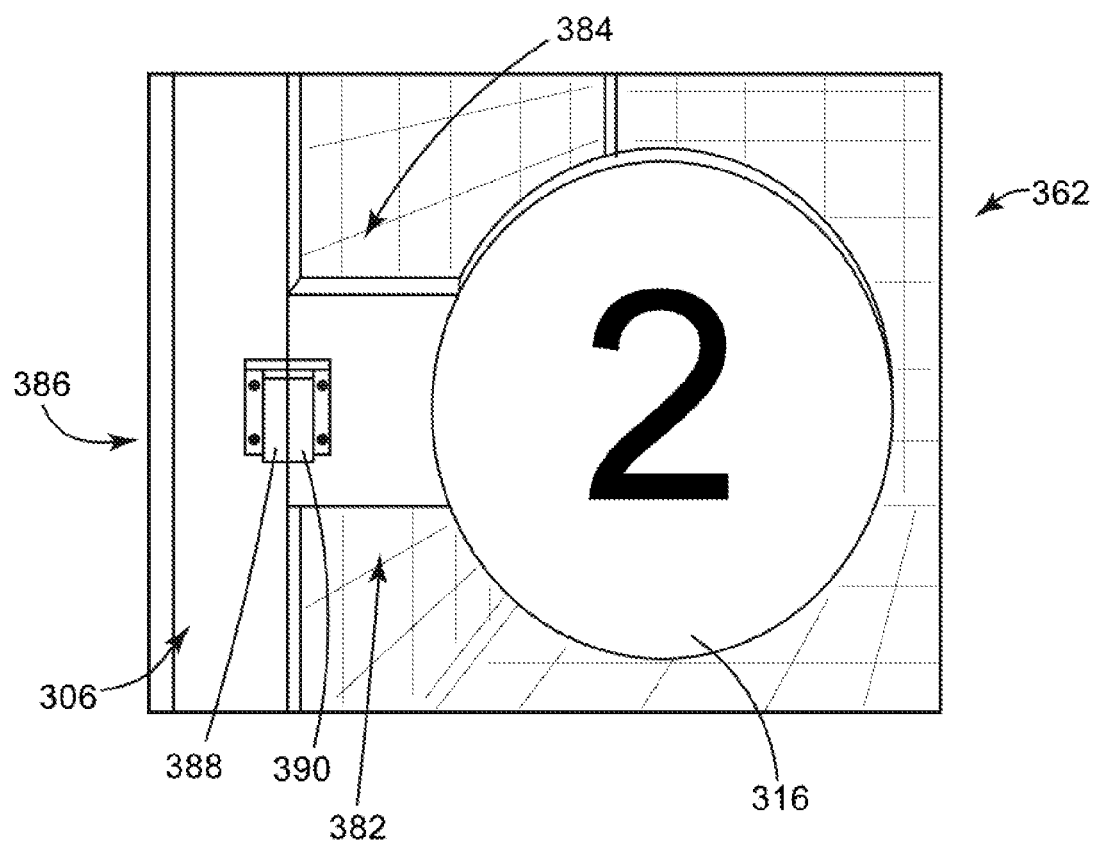
FIG. 8 depicts a detail view of the target members on the device of FIGS. 5 and 6 in a first orientation.
Figure 9:
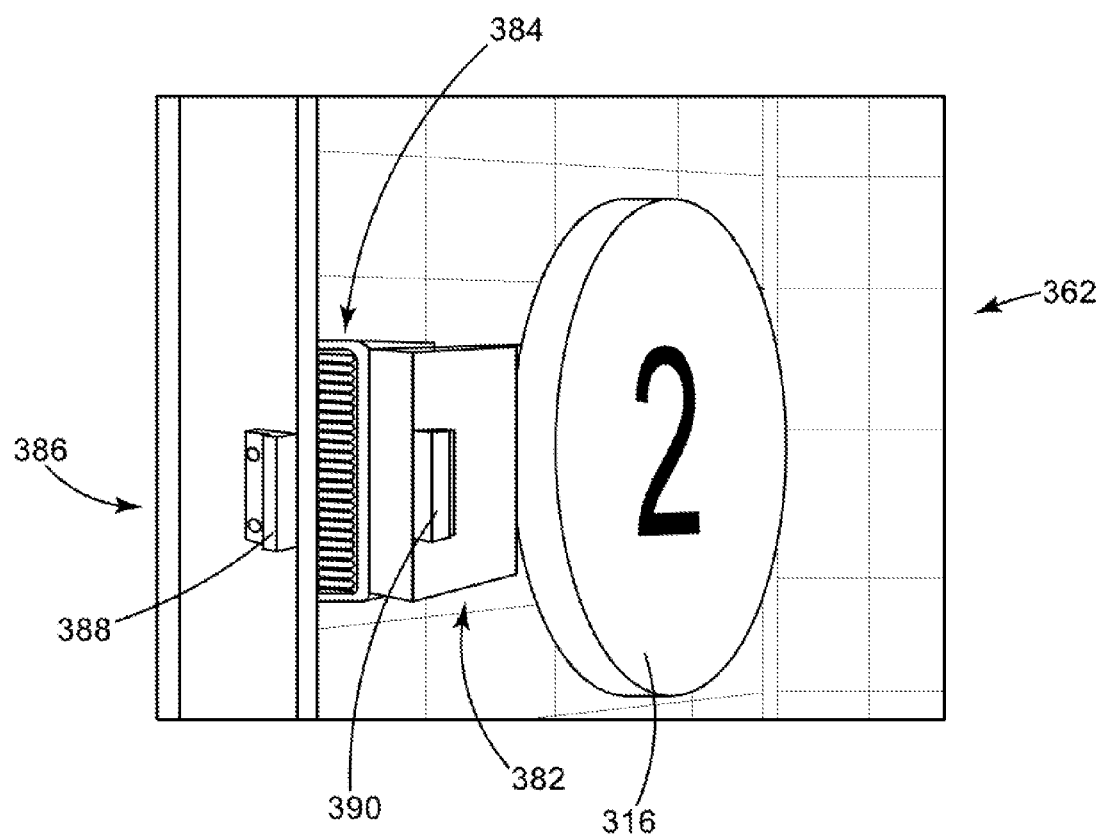
FIG. 9 depicts the target member of FIG. 8 in a second orientation.

FIGS. 8 and 9 show a detail view of a target member (e.g., target member 362 of FIG. 7) to illustrate one construction of the target member for use on the devices disclosed herein. This construction allows the target member to assume a plurality of orientations in response to contact by the projectile on the target 316. FIG. 8 illustrates the target member in a first orientation with the target 316 substantially forward-facing and/or substantially parallel to a plane tangent to points on the frame 302 (FIG. 7) and, in one example, tangent to a point on a first frame member (e.g., frame member 106 of FIG. 1) and a point on a second frame member (e.g., frame member 108 of FIG. 1). The target member 362 includes a bracket assembly with, in this example, a bracket member 382 and a target joint member 384. The bracket assembly couples the target 316 to the frame 302 at, e.g., the first frame member 306. The target member can also include a sensor member 386 with a first sensor element 388 and a second sensor element 390. Examples of the sensor member 386 can include optical and magnetic sensors in which the sensor elements 388, 390 form an emitter-detector arrangement. Examples of the emitter-detector arrangements include one element (the "emitter") that generates a signal (e.g., light, magnetic waves, etc.) and one element (the "detector") that senses the signal.

FIG. 9 illustrates the target member in a second orientation that can occur after contact by the projectile. In the second orientation, the target 316 is disposed at an angle to a plane across the goal face. This angle separates the first sensor member 388 from the second sensor element 390, which can cause the sensor member 386 to indicate (e.g., via an output) contact between the projectile and the target 316. In one example, the target joint member 384 can include a biasing element (e.g., a spring) that causes the target member to automatically (or by default) assume an orientation. For purposes of the present example, the target joint member 384 includes a spring that returns the target member to the first orientation. This feature readies the device 300 for impact by the projectile.

The cross-sections of FIGS. 10 and 11 illustrate constructions for the frame members (e.g., members 106, 108, 110, 112 of FIG. 1) of the frame 302. In FIG. 10, the construction can form a conduit 392 that can house a wiring harness 394. The conduit 392 serves to protect the wires of the wiring harness 394. These wires can extend to the target members (FIGS. 6 and 7) to exchange power and signals to the sensor member 386 (FIGS. 8 and 9). FIG. 11 depicts an example in which the frame members integrate one or more conductors 396 that form electrical "traces" throughout the frame assembly. These electrical "traces" can couple with complementary features to exchange signals with the sensors members 386 (FIGS. 8 and 9). Examples of the conduit 392 can include tubing of various materials (e.g., plastics, metals, composites, etc.) and shapes (e.g., rectangle, square, circular, etc.). This disclosure does, however, also contemplate configurations of the conduit 392 that do not exhibit a contiguous outer boundary. That is, the conduit 392 may have only three sides and/or or two sides. In such configurations, the design may include one or more devices that can couple the wires of the wiring harness 394 to the conduit 392.

Figure 12:
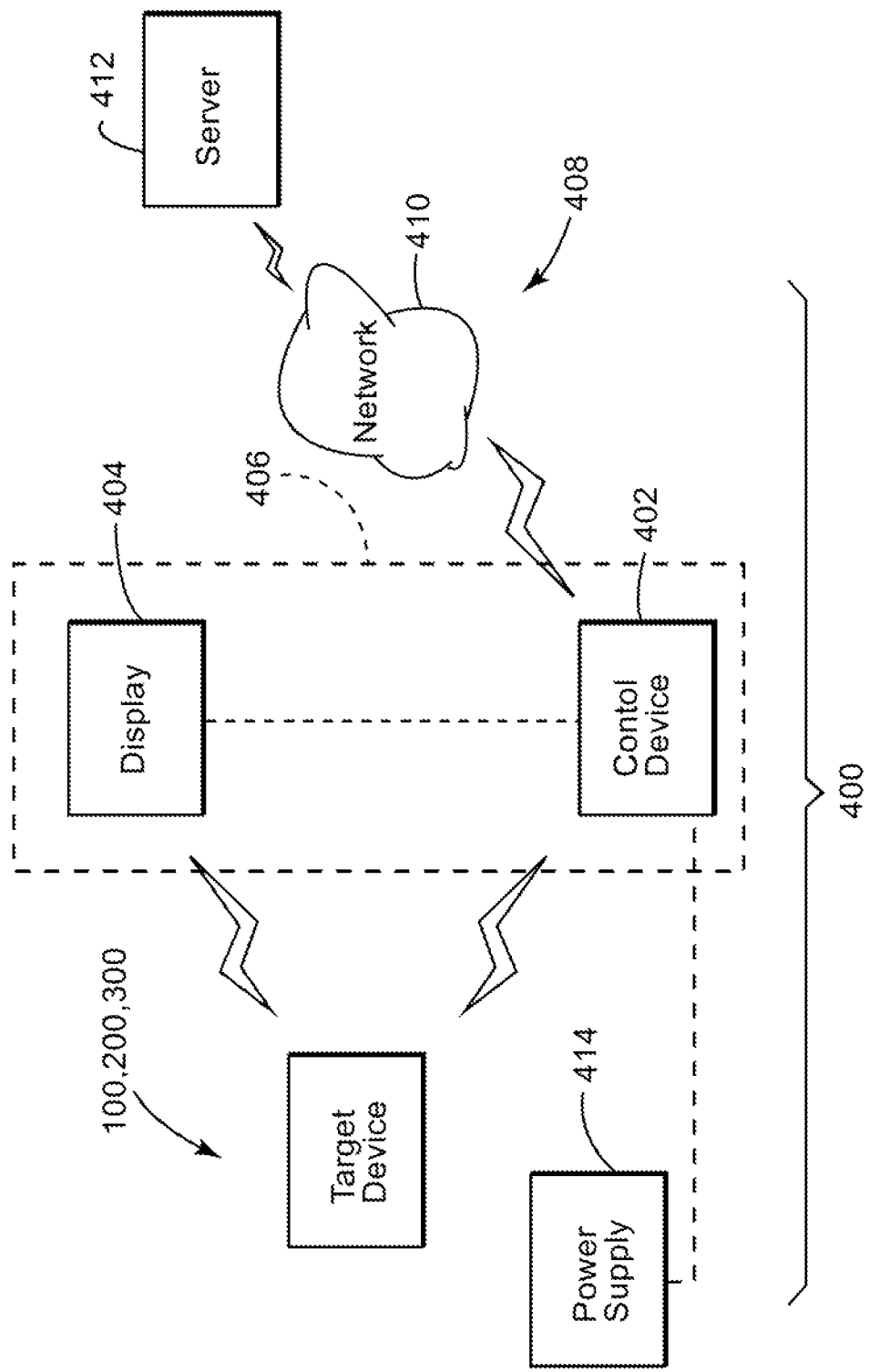
FIG. 12 depicts a schematic diagram of an exemplary embodiment of a sports training device as part of an example of a training system.

FIG. 12 depicts a schematic diagram of an example of a training system 400 that incorporates an embodiment of a sports training device (e.g., devices 100, 200, 300). The system 400 include a control device 402 and a display 404, the combination of which may be part of a terminal 406. Examples of the terminal 406 can include a variety of computing devices (e.g., personal computers, workstations, laptop computers, tablet computers, smartphones, etc.) that an end user can utilize to interface with the training device via, for example, a software program, an application, and like configuration of executable instructions (e.g., software, firmware, combinations of hardware and firmware) that can instruct operation of the training device and/or the system 400 in general. In one embodiment, the system 400 can communicate with a network system 408 that has a network 410 that can deploy various wired and wireless constructions, as desired, to facilitate the exchange of data and information among the components. In one implementation, the network system 408 may incorporate one or more external data servers 412. In one embodiment, the system 400 may include one or more power source 414 that provide power, e.g., to the target device and/or the control device 402. The power source 414 may be integrated into the respective device as, for example, a battery, power cell, solar array, etc. In other constructions, the power source 414 may embody a remote supply that connects with components of the system 400 via a cord and/or other implement that is useful to conduct electrical signals.

Examples of the control device 402 can provide various processing capabilities that are useful for operation of the target device. These examples may include circuitry with components to receive and/or generate inputs and outputs. The components can embody one or more processors, one or more memories, and one or more executable instructions in the form of software, hardware, and/or firmware. In one implementation, the circuitry couples with the target device to register the change in orientation of the target members on the display 404. The control device 402 may provide power, e.g., by way of a cable and/or other electrical conductor that can transmit power and signals through a wiring harness to sensors on the target members. The display may, in turn, register changes in state of the sensors from, for example, a first state at a first voltage and a second state having a second voltage that is different from the first voltage.

During operation, one or both of the control device 402 and display 404 couples with the training device via the device input panel (e.g., device input panel 379 of FIG. 7). This configuration allows these components to exchange inputs and outputs in the form of signals and/or information. In this way, the system 400 registers contact between the projectile and the target members on the target device. This feature may take the form of a tally or score, which displays on the display 404.

In one implementation, the control device 402 can instruct the operation of the device to dictate the way in which the score is compiled. These instructions can cause the system 400 to operate among a plurality of operating modes that can enhance use of the training device. These operating modes can define certain scoring protocols, wherein the scoring protocols assign and/or awards points to the end user that successfully hits the target members with the projectile. The scoring protocols may also configure the training device to require the end user to hit the target members in a certain sequential order. In this way, the end user can utilize the system 400 to implement various, different training regiments and/or games.

In light of the foregoing, embodiments of the sports training device, and implementation thereof, incorporate features to facilitate installation, use, and transportation of the training device. These embodiments utilize structure that can change the configuration of the training device, thus rendering a design that can change the size and/or shape of the training device for easy transport and set-up.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sports training device, comprising:
a frame at least partially circumscribing a frame opening, the frame comprising a top frame member, a bottom frame member, and a pair of peripheral frame members including a first peripheral frame member and a second peripheral frame member, one each coupled to opposite sides of the top frame member and the bottom frame member,
wherein each of the top frame member and the bottom frame member include joints that are configured to permit the first peripheral frame member and second peripheral frame member to rotate inwardly toward a center plane of the frame; and
a target assembly coupled with the frame, the target assembly comprising a first target member that is configured to couple with either the first peripheral frame member or the second peripheral frame member, the first target member having a target disposed in the frame opening,
wherein rotation at the joints causes the frame to assume a first frame configuration and a second frame configuration that is different from the first frame configuration,
wherein the first frame configuration and the second frame configuration define a frame member distance between the first peripheral frame member and the second peripheral frame member, and
wherein the frame member distance has a first frame member distance in the first frame configuration and a second frame member distance in the second frame configuration that is less than the first frame member distance.

2. The sports training device of claim 1, wherein the target member is configured to assume a first orientation and a second orientation, wherein the first orientation positions the target substantially parallel to a plane that is tangent to a point on the first peripheral frame member and a point on the second peripheral frame member, and wherein the second orientation positions the target at an angle to the plane.

3. The sports training device of claim 2, wherein the target member comprises a biasing element that is configured to move the target member from the second orientation to the first orientation.

4. The sports training device of claim 2, wherein the target member is configured to generate an output that indicates the orientation of the target.

5. The sports training device of claim 4, wherein the target member comprises a sensor member that is configured to generate the output.

6. The sports training device of claim 1, wherein the target assembly comprises a first set of target members disposed on the first peripheral frame member and a second set of target members disposed on the second peripheral frame member.

7. The sports training device of claim 6, further comprising a device input coupled with the frame and a wiring harness coupled with the device input and extending along the frame, the wiring harness comprising wires that couple the first set of target members and the second set of target members to the device input.

8. A sports training device, comprising:
a frame having a top frame member, a bottom frame member, and a pair of peripheral frame members including a first peripheral frame member, a second peripheral frame member, one each coupled to opposite sides of the top frame member and the bottom frame member so as to form a frame opening, the frame comprising a center plane disposed between the first peripheral frame member and the second peripheral frame member;
a joint assembly comprising a first joint and a second joint integrated into the top frame member and the bottom frame member, the first joint and the second joint having an axis of rotation that allows the first peripheral section and the second peripheral section to rotate relative to the top frame member and the bottom frame member; and a target assembly comprising a first target member and a second target member, one each disposed on the first peripheral frame member and the second peripheral frame member, the first target member and the second target member having a target with at least one orientation that configures the target at an angle to a plane that is tangent to at least two points on the frame.

9. The sports training device of claim 8, wherein the frame has a first configuration and a second configuration that define an outer dimension for the frame, and wherein the outer dimension in the first configuration is greater than the outer dimension in the second configuration.

10. The sports training device of claim 8, wherein the target members comprise a target articulating joint with a biasing element that returns the target member to a first orientation from a second orientation disposed at the angle.

11. The sports training device of claim 8, wherein the target members comprise a sensor member that is configured to generate the output.

12. A training system, comprising:

a device comprising a frame with a plurality of target members disposed thereon, the frame having a top frame member, a bottom frame member, and a pair of side frame members coupled to opposite sides of the top frame member and the bottom frame member to form a frame opening, the top frame member and the bottom frame member including joints for articulating part of the top frame member and part of the bottom frame member so as to cause the pair of side frame members to rotate inwardly toward a center plane of the frame, the target members comprising a target disposed on at least one of the side frame members and with at least one orientation that configures the target at an angle to a plane that is tangent to at least two points on the frame; and a control device that is configured to connect with the device, the control device configured to generate an output that instructs operation of the device between a number of operating modes that define a scoring protocol for the device.

13. The training system of claim 12, wherein the operating modes comprise a first operating mode in which the scoring protocol assigns a scoring value to each of the target members.

14. The training system of claim 13, wherein the operating modes comprise a second operating mode in which the scoring protocol assigns the target members a position in a sequential listing, and wherein the sequential listing identifies an order that registers scoring values for each of the target members.

15. The training system of claim 12, wherein the target assembly comprises a first set of target members and a second set of target members disposed on the pair of side frame members.

16. The training system of claim 15, wherein the target assembly includes at least one target member disposed on the top frame member and the bottom frame member.

* * * * *